(12) United States Patent
Moretti

(10) Patent No.: US 6,497,740 B1
(45) Date of Patent: Dec. 24, 2002

(54) SNAP-IN VENT FILTER ASSEMBLY

(75) Inventor: Stephen L. Moretti, Auburn, NY (US)

(73) Assignee: Carrier Corporation, Farmington, CT (US)

( * ) Notice: Subject to any disclaimer, the term of this patent is extended or adjusted under 35 U.S.C. 154(b) by 0 days.

(21) Appl. No.: 09/859,095

(22) Filed: May 16, 2001

(51) Int. Cl.⁷ .......................... B01D 35/00; F25D 17/06
(52) U.S. Cl. .............................. 55/418; 55/467; 55/490; 55/495; 55/505; 55/DIG. 31; 62/262; 62/409
(58) Field of Search .......................... 55/418, 418.1, 55/410, 415, 467, 471, 467.1, 490, 490.1, 495, 505, DIG. 31; 454/202, 207, 236, 266, 322, 333, 327; 62/262, 409

(56) References Cited

U.S. PATENT DOCUMENTS

| | | | | |
|---|---|---|---|---|
| 2,801,582 A | * | 8/1957 | Kuhlenschmidt et al. ... | 454/202 |
| 2,986,016 A | * | 5/1961 | Gillham et al. ............... | 62/409 |
| 3,921,416 A | * | 11/1975 | Murnane et al. .............. | 62/262 |
| 4,505,129 A | * | 3/1985 | Yamane et al. ............... | 62/262 |
| 4,524,588 A | * | 6/1985 | Bond .......................... | 62/262 |
| 5,056,333 A | * | 10/1991 | Cho ............................ | 62/262 |
| 6,223,547 B1 | * | 5/2001 | da Silva et al. .............. | 62/262 |

* cited by examiner

*Primary Examiner*—Duane Smith
*Assistant Examiner*—Jason M. Greene
(74) *Attorney, Agent, or Firm*—Wall Marjama & Bilinski LLP

(57) ABSTRACT

An air filter unit for use in an air conditioner having an outside air duct through which air passes through a divider wall separating the outdoor section and indoor section of the air conditioner. The air filter unit includes a filter frame containing an air filter and a connector for removably supporting the frame upon the divider wall so that the air filter covers substantially all of the duct entrance. A hinge is located along one side edge of the frame and a door is mounted upon the hinge between an open position wherein outside air can move through the filter into the duct and a closed position wherein outside air is prevented from moving through the filter into the duct. Controls for selectively positioning the door are provided inside the front cover of the unit.

5 Claims, 5 Drawing Sheets

SNAP-IN VENT FILTER ASSEMBLY

FIELD OF THE INVENTION

This invention relates generally to an outdoor air vent for an air conditioning unit, and specifically to a combination outdoor air filter and positionable door for an air conditioning unit vent system.

BACKGROUND OF THE INVENTION

This invention will be explained with reference to a packaged terminal air conditioning unit of the type typically found in hotel and motel rooms to provide comfort air to the room. The unit is usually mounted within a rectangular shaped sleeve that is located within an outside wall of the room. The unit includes a wall that divides the unit into an indoor section and an outdoor section. The air in the room is conditioned within the indoor section where it is either heated or cooled, depending upon the mode of operation that is selected. Outside air is drawn into the unit and mixed with the conditioned indoor air through an opening in the divider wall to keep the indoor air fresh.

A filter is typically placed in the divider wall opening to remove contaminants from the outdoor air being brought indoors. The amount of outdoor air passing through the opening is generally controlled by a positionable door that can be set at one of an infinite number of positions between a fully opened position and a fully closed position. Although the outside air system works well in practice, it typically involves a rather large number of inter-related component parts which are difficult to mount in assembly and add to the overall cost of the unit. In addition, the filter must be periodically removed form the unit for cleaning or replacing, however, this generally requires removal of the entire door assembly in order to reach the filter which is a time consuming and oftentimes difficult task.

SUMMARY OF THE INVENTION

It is therefore an object of the present invention to improve air conditioning units.

It is a further object of the present invention to better facilitate the cleaning and replacement of the outdoor air filter of an air conditioning unit.

A still further object of the present invention is to reduce the number of component parts needed to filter and control the flow of outside air into the indoor section of a packaged terminal air conditioner.

Another object of the present invention is to reduce the manufacturing and maintenance costs associated with a packaged terminal air conditioner.

These and other objects of the present invention are attained by an air filter unit for use in an air conditioning unit that has a divider wall between the indoor section and the outdoor section of the unit. A filter frame containing an air filter is arranged to enclose the entrance to an air duct that passes through the divider wall. Hinge pins protrude from the top and bottom sections of the frame adjacent to one side edge. The hinge pins are adapted to mate with tabs mounted upon a door so that the door can pivot between a fully open position and a fully closed position against the filter frame. A control lever is mounted on a side wall of the unit beneath the front cover of the unit. The lever can be manually adjusted when the cover is removed to set the position of the door and thus regulate the amount of air passing through the duct.

BRIEF DESCRIPTION OF THE DRAWING

For a better understanding of these and other objects of the invention, reference will be made to the following detailed description of the invention which is to be read in connection with the accompanying drawing, wherein.

DETAILED DESCRIPTION OF THE INVENTION

Figure 1:
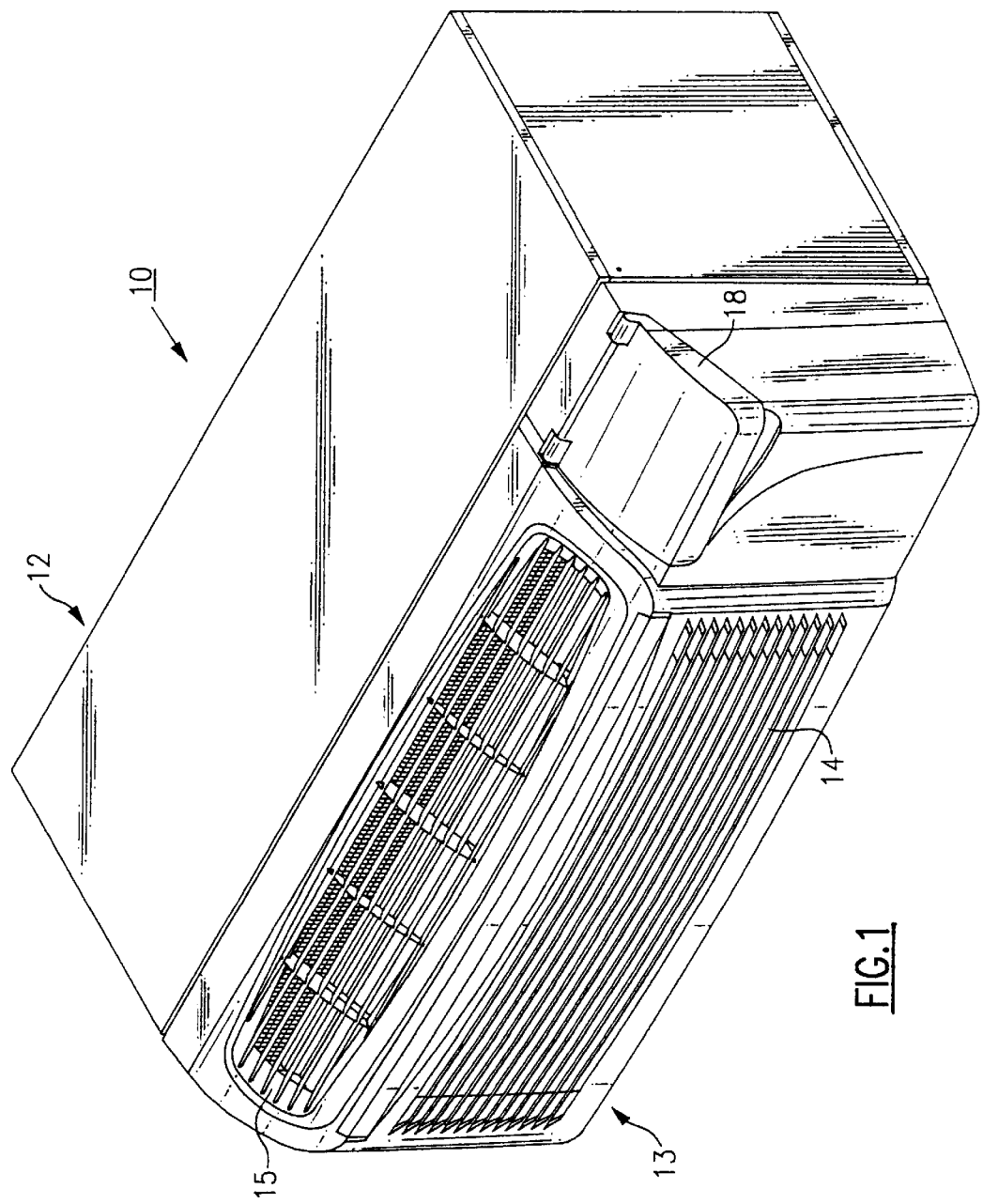
FIG. 1 is a perspective view of an air conditioning unit embodying the teachings of the present invention.

Turning initially to FIG. 1, there is illustrated an air conditioning unit, generally referenced 10, that embodies the teachings of the present invention. The unit in this embodiment of the invention is a packaged terminal air conditioner (PTAC) of the type generally found in hotels and motels for heating or cooling a specific comfort area such as a room or the like. The unit is housed within a sleeve 12 that passes through an outside wall of the building in which the comfort area is located. The sleeve is fabricated to standard dimensions so that different units supplied by various manufacturers can be interchangeably mounted in the sleeve. The front of the unit is closed by a removable front cover 13. The cover contains an inlet opening 14 through which air is drawn into the unit from the comfort area being serviced by the unit and a second outlet opening 15 through which conditioned air is returned to the comfort region. As is well known in the art, the unit can provide either heated or cooled air to the comfort area depending upon the selected mode of operation.

A recessed control panel is mounted behind the front cover beneath a hinged door 18. Although not shown, the control panel contains a temperature control for regulating the temperature output of the unit and a mode control for selectively placing the unit in either a heating or cooling mode of operation.

Figure 2:
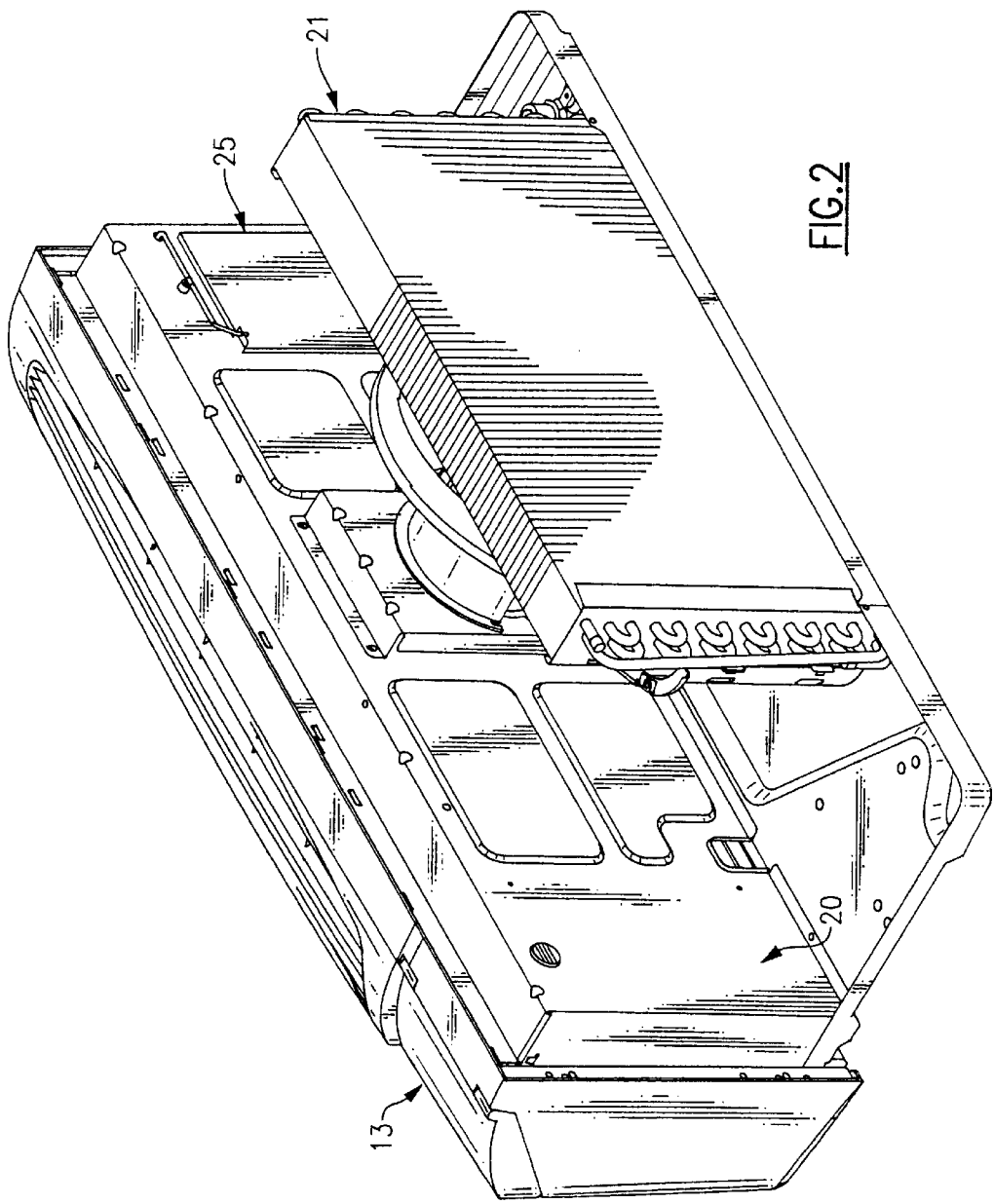
FIG. 2 is a rear perspective view of the air conditioning unit shown in FIG. 1 with portions removed to better display the inner workings of the unit.
Figures 3, 4:
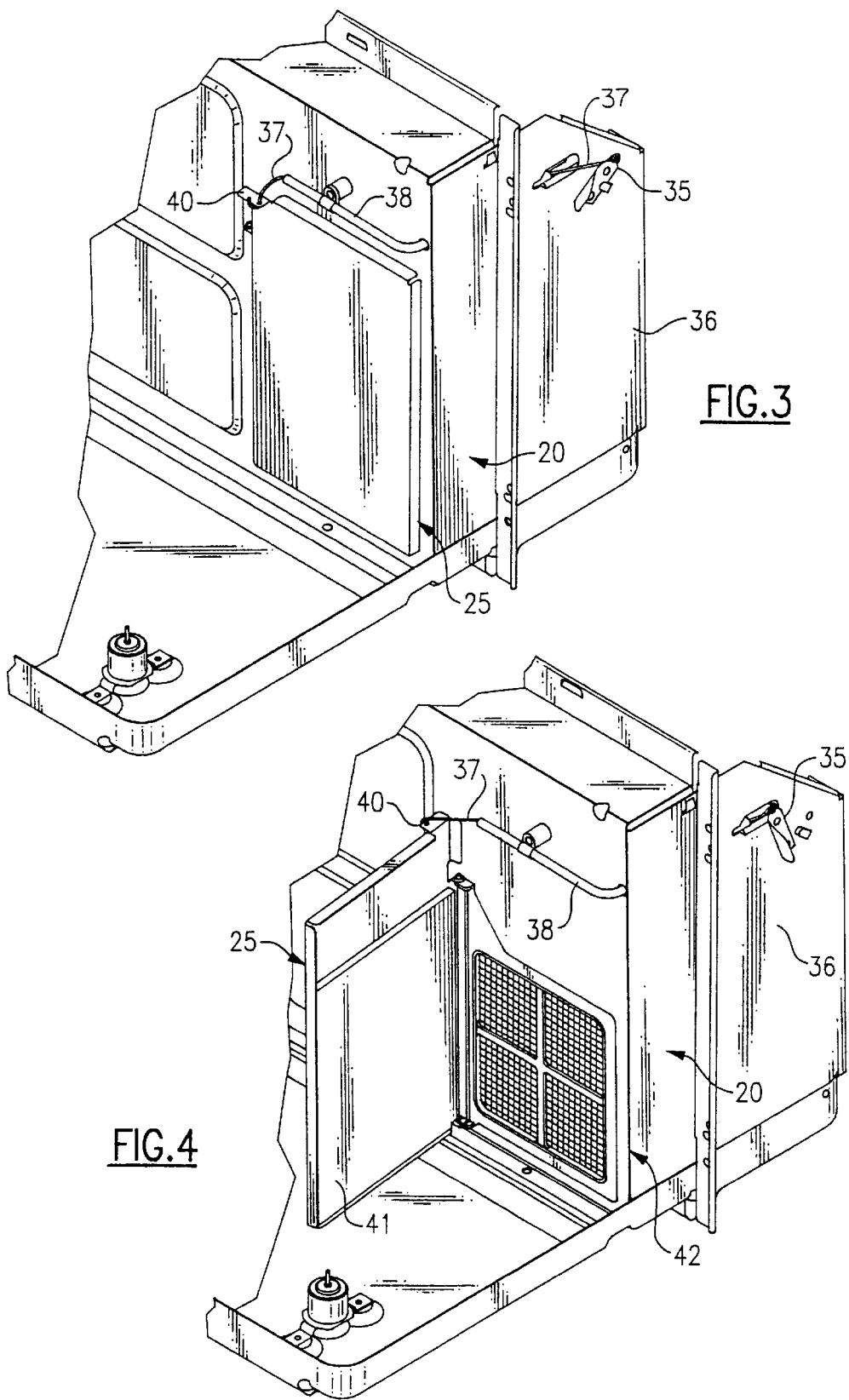
FIG. 3 is an enlarged perspective view illustrating the entrance to the outside air duct located in the divider wall of the unit showing the entrance door in a closed position.
FIG. 4 is a view similar to FIG. 3 showing the outside air filter and the entrance door in an open position.

Turning now to FIGS. 2–6, the air conditioning unit is separated by a divider wall 20 into an outdoor section 21 and an indoor section which is located beneath the front cover. The wall is sealed and insulated so that it forms a barrier between the two sections to prevent air from being exchanged between the sections. A hinged door 25 is mounted on the back side of the wall which, when closed, covers a rectangular air duct 27 (FIG. 5) through which outside air can be delivered into the indoor section of the unit. The outdoor air is mixed with indoor air to continually freshen the supply of indoor air as it is being conditioned As will be explained below in greater detail, the door is hinged so it can be brought to a fully opened position as illustrated in FIGS. 2 and 3 or tightly closed against the back of the divider wall as shown in FIG. 4. to prevent outside air from passing through the duct. The door is manually operated by a lever arm 35 rotatably mounted in a side wall panel 36 located in the indoor section of the unit beneath the front cover. Control over the door position can only be gained by removing the front cover. A wire 37 is slidably supported in a flexible conduit 38 and connects the lever arm to a lug 40 mounted upon the top edge of the door. Rotating the lever arm moves the door in one direction. The back of the door is provided with a resilient pad of insulation 41 that is arranged to close against an air filter assembly 41 mounted in the entrance to the duct when the door is closed.

Figure 5:
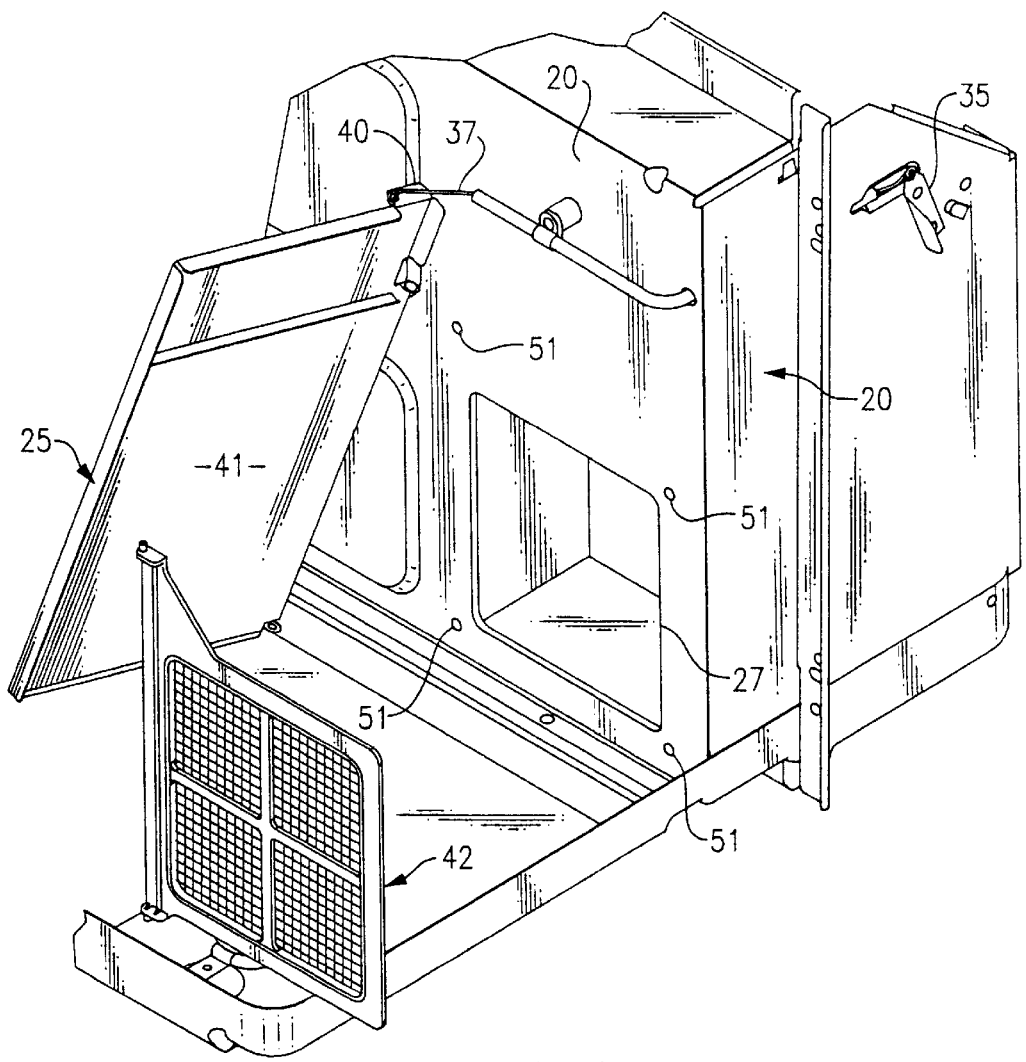
FIG. 5 is an exploded view similar to FIG. 3 showing the outside air filter and the entrance door decoupled from the unit.
Figure 6:
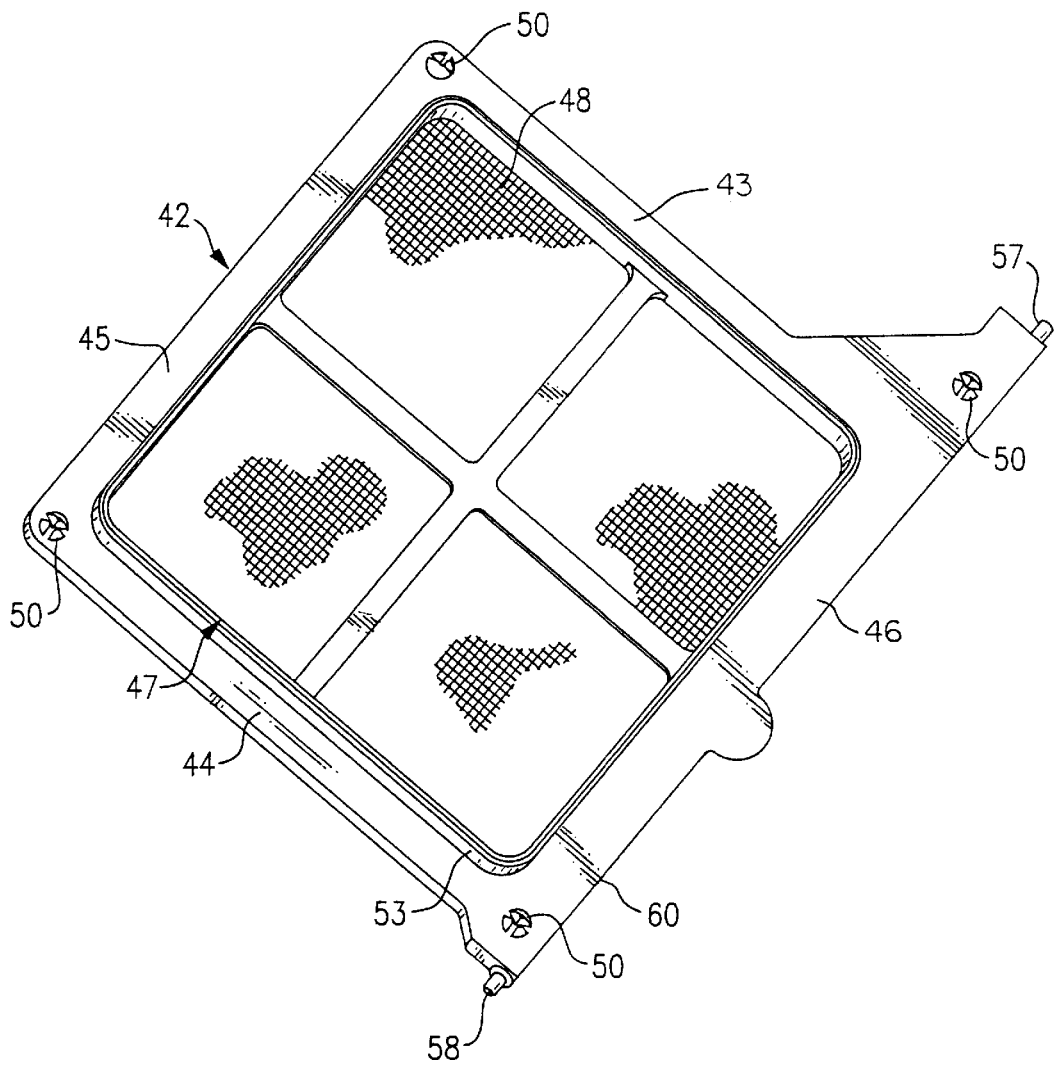
FIG. 6 is a further enlarged perspective view of the filter further illustrating the snap in fasteners used to secure the filter frame to the divider wall.

The filter assembly 42 is shown in greater detail in FIG. 6 and includes a generally rectangular shaped frame having a top member 43, a bottom member 44, and a pair of opposed side members 45 and 46 that coact to form a rectangular shaped opening in the frame. An air filter 47 is mounted within the opening which contains a filtering material 48 for removing particulate material and other types of contaminants that might be contained within the outside air stream entering the duct 27. Four snap-in fasteners 50 are mounted upon the back side of the filter which are adapted to be removably received within holes 51 (FIG. 5) provided in the divider wall around the duct opening. An outwardly extended rim 53 is contained in the back wall of the frame which surrounds the rectangular shaped opening in the frame. The rim, in assembly, passes into the entrance region of the duct and forms a close sliding fit therewith. Accordingly, the rim registers the filter frame with the duct and aligns the snap-in fasteners 50 with the received holes so that the frame can be easily secured in place by simply applying a slight inward pressure to the frame. The frame and the snap-in fasteners are preferably integrally molded from any suitable plastic.

A pair of hinge pins 57 and 58 are located at the top and bottom edges of the filter frame adjacent to a side edge 60. A pair of spaced apart tabs 62 and 63 are mounted in the door having holes formed therein. The tabs are flexible enough so that they can be passed over the hinge pins and thus rotatably support the door upon the filter frame as best illustrated in FIG. 4.

As illustrated in FIG. 5, the filter can be easily removed from the unit for replacing or cleaning by simply snapping the frame out of the entrance region of the outside air duct and removing the door from the hinge pins. The control wire for the door need not be disconnected from the lever arm or the door thereby saving a good deal of time and effort when the filter is removed for maintenance.

While the present invention has been particularly shown and described with reference to the preferred mode as illustrated in the drawing, it will be understood by one skilled in the art that various changes in detail may be effected therein without departing from the spirit and scope of the invention as defined by the claims.

I claim:

1. An air filter unit for use in an air conditioner having an outside air duct through which air passes through a divider wall separating the outdoor section and indoor section of the air conditioner, said air filter unit including:

a filter frame containing an air filter, means for removably supporting said frame to the divider wall at the entrance region of said duct so that the air filter covers substantially all of the duct entrance;

a hinge means located along one side edge of said flame;

a door mounted upon said hinge means that is movable between an open position wherein outside air can move through said filter into said duct and a closed position wherein outside air is prevented from moving through said filter into said duct; and control means for selectively positioning said door.

2. The filter unit of claim 1 wherein said control means includes a lever arm rotatably mounted upon said air conditioner unit that is coupled by a flexible coupling so that said door can be repositioned as the lever arm is turned.

3. The filter unit of claim 1 that further includes snap in fasteners for removably mounting the filter frame to the entrance region of said duct.

4. The filter unit of claim 1 wherein said hinge means further includes a hinge pin extending outwardly beyond top and bottom edges of said frame and tabs mounted upon said door having holes therein for receiving the extended ends of said hinge pin therein.

5. The filter unit of claim 1 wherein said frame has a rectangular shaped opening therein and a rim extending outwardly from the inner surface of the frame that is slidably received within the duct entrance.

* * * * *